United States Patent [19]

Flatt

[11] Patent Number: 5,247,088
[45] Date of Patent: Sep. 21, 1993

[54] PROCESS FOR THE CONTINUOUS PREPARATION OF PERYLENETETRACARBOXYLIC DIIMIDES

[75] Inventor: Thomas R. Flatt, Summerville, S.C.

[73] Assignee: Miles Inc., Pittsburgh, Pa.

[21] Appl. No.: 738,086

[22] Filed: Jul. 30, 1991

[51] Int. Cl.$^5$ ............................................. C08H 17/14
[52] U.S. Cl. ....................................................... 546/37
[58] Field of Search ............................................. 546/37

[56] References Cited

U.S. PATENT DOCUMENTS

| 1,200,848 | 9/1916 | Kardos et al. | 546/98 |
| 1,913,052 | 6/1933 | Jaeger et al. | 546/37 |
| 3,446,810 | 5/1969 | Dien et al. | 544/339 |
| 3,615,800 | 10/1971 | Spietschka et al. | 106/493 |
| 4,588,814 | 5/1986 | Spietschka et al. | 546/37 |

FOREIGN PATENT DOCUMENTS 54806 6/1982 European Pat. Off. .

OTHER PUBLICATIONS

Chemical Abstracts vol. 42:5892i (1948).

*Primary Examiner*—Marianne M. Cintins
*Assistant Examiner*—Catherine S. Kilby Scalzo
*Attorney, Agent, or Firm*—Joseph C. Gil; Richard E. L. Henderson

[57] ABSTRACT

This invention relates to a novel process for the continuous preparation of perylenetetracarboxylic diimides by fusion of a naphthalimide in a mixture of an alkali metal hydroxide and, optionally, an alkali metal carboxylate to form an initial leuko condensation product that is subsequently oxidized in an aqueous medium to form the perylenetetracarboxylic diimide.

19 Claims, No Drawings

PROCESS FOR THE CONTINUOUS PREPARATION OF PERYLENETETRACARBOXYLIC DIIMIDES

BACKGROUND OF THE INVENTION

This invention relates to a novel process for the continuous preparation of perylenetetracarboxylic diimides by fusion of naphthalimide in a mixture of an alkali metal hydroxide and, optionally, an alkali metal carboxylate and subsequent air oxidation. The perylenetetracarboxylic diimides thus prepared are useful as pigments for coatings (for example, in automotive, industrial, and architectural applications) and plastics, as well as for fibers. In general, the process of the invention should give products that are useful wherever corresponding products made from the batch processes are used.

It has long been known that perylenetetracarboxylic diimides can be prepared by fusing naphthalenedicarboxylic diimides in the presence of an alkali or certain amine bases. For example, U.S. Pat. No. 1,200,848 discloses a process in which N-substituted 1,8-naphthalenedicarboxylic diimides are heated in an alkaline melt. It has been noted, however, that this method produces product contaminated with large quantities of impurities that are difficult to remove. See U.S. Pat. No. 1,913,052. The desirability of using commercially more viable methods has spurred efforts to improve fusion processes based on alkali metal bases.

It is possible to improve the quality of the diimides by carrying out caustic fusion in the presence of special additional reagents and solvents, such as special glycol solvents and their monoalkyl ethers. E.g., U.S. Pat. Nos. 3,615,800 and 3,446,810. However, the use of solvents or other special reagents add to the cost.

More elegant processes involving the use of alkali metal hydroxides, optionally in the presence of sodium acetate, have been reported. See *Chemical Abstracts*, 42:5892i (1948); European Patent Application 54,806; and U.S. Pat. No. 4,588,814. In these methods, the caustic fusion produces an intermediate leuko material that is then oxidized in air (see, e.g., BIOS Final Report, 1484, page 21) or with oxidizing agents such as peroxydisulfates, nitrates, chlorates, adducts of hydrogen peroxide and borates, or hypochlorites (see, e.g., European Patent Application 54,806) to form the perylenetetracarboxylic diimide product.

Although the more recently reported batchwise methods discussed above produce good quality product, a more efficient continuous process would be desirable. For example, the need for an evacuated reactor in the process disclosed in U.S. Pat. No. 4,588,814 would present practical difficulties for a continuous process. Continuous process methods have been reported for other types of pigments, particularly copper phthalocyanine, but until now have not been reported for the preparation of perylenetetracarboxylic diimides. The present invention provides such a continuous process for preparing perylenetetracarboxylic diimides using smaller quantities of alkali than used in the previously known methods, even when such smaller quantities of alkali lead to high viscosity. In addition, increased yields of high quality product can be obtained using the present method.

SUMMARY OF THE INVENTION

This invention relates to a process for the continuous preparation of a perylenetetracarboxylic diimide of formula I

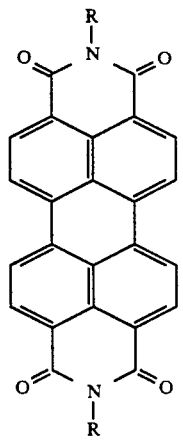

wherein each R is independently hydrogen, $C_1$-$C_6$ alkyl, $C_7$-$C_{15}$ aralkyl, or a metal atom, comprising
(a) preparing a reaction mixture by mixing
 (1) a naphthalimide of formula II

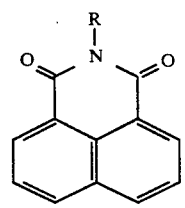

wherein R is hydrogen, $C_1$-$C_6$ alkyl, $C_7$-$C_{15}$ aralkyl, or a metal atom,
 (2) at least about one part by weight, based on the naphthalimide, of one or more alkali metal hydroxides (preferably potassium and/or sodium hydroxide), and
 (3) optionally, an alkali metal carboxylate (preferably sodium acetate);
(b) passing the reaction mixture through a continuous reactor having one or more heated zones at a temperature of at least 130° C. (preferably at least 160° C.) to form a condensation product;
(c) oxidizing the condensation product in an aqueous medium to form the perylenetetracarboxylic diimide; and
(d) isolating the perylenetetracarboxylic diimide.

DETAILED DESCRIPTION OF THE INVENTION

The process of the invention is suited to the preparation of perylenetetracarboxylic diimides, preferably those of Formula I in which both groups R are hydrogen or a metal atom (especially those in which both groups R are hydrogen). It is also possible, but less preferred, to prepare compounds of Formula I in which R is $C_1$-$C_6$ alkyl or $C_7$-$C_{15}$ aralkyl.

As used herein, the term "$C_1$-$C_6$ alkyl" refers to straight or branched chain aliphatic hydrocarbon groups having from 1 to 6 carbon atoms, also referred to as lower alkyl. Examples of $C_1$-$C_6$ alkyl are methyl, ethyl, propyl, butyl, pentyl, hexyl, and the isomeric forms thereof.

The term "$C_7$-$C_{15}$ aralkyl" refers to $C_1$-$C_6$ alkyl substituted with $C_6$-$C_{10}$ aryl such that the total number of carbon atoms is from 6 to 15. Examples of $C_7$-$C_{15}$ aralkyl are benzyl, phenethyl, and naphthylmethyl.

The term "metal atom" refers to a metal or metal within a complex. Each metal atom is, in a formal sense, covalently or ionically bound with an imide nitrogen atom as represented in Formulas I and II regardless of the actual chemical and physical chemical binding. For example, the metal may interact directly with a nitrogen atom or with the —(C=O)—NR—(C=O)—imide group as a whole. Preferred metal atoms are alkali metals, such as lithium, sodium, potassium, rubidium, or cesium, that are bound ionically to the imide moiety.

It is particularly preferred to use the process of the invention to prepare symmetrically substituted perylenetetracarboxylic diimides from corresponding symmetrically substituted naphthalimides, that is, from compounds of formula II in which both benzene rings are ring-substituted in a mirror symmetry fashion with the same group R. The unsubstituted compound in which all groups R are hydrogen is most preferred.

It is also possible, but less preferred, to prepare asymmetrically substituted perylenetetracarboxylic diimides from mixtures of naphthalimides having different groups R, but statistical mixtures of products are formed and require separation if pure products are desired.

The first step in the process of the invention involves preparing a reaction mixture by mixing naphthalimide of formula II, one or more alkali metal hydroxides, and, optionally, an alkali metal acetate carboxylate. These components are preferably mixed in solid form, but it is also possible to add one or more components in molten form. Suitable alkali metal hydroxides include lithium, sodium, potassium, rubidium, and cesium hydroxides, preferably potassium and/or sodium hydroxide. It is particularly preferred to use alkali metal hydroxides containing a small quantity of water, which allows the alkali metal hydroxide to melt at lower temperatures than the dry material. Suitable alkali metal carboxylates preferably include alkali metal alkanoates, such as acetates, propanoates, butanoates, and the like, although the use of other alkali metal carboxylates such as sodium benzoate can in theory also be used. Suitable alkali metal acetates include lithium, sodium, potassium, rubidium, and cesium acetates, preferably sodium acetate. The preferred alkali metal acetates, although not essential to the process of the invention, generally improve yields and purity.

Although the fusion reaction can be carried out using a large excess of alkali metal hydroxide, a key feature of the continuous process of the present invention is the ability to use relatively lower quantities of base when compared to previously reported processes. For example, when using potassium hydroxide according to the invention, as little as one part by weight relative to the naphthalimide can be used. It is preferred, however, to use from 1.6 to 5 parts by weight, and more preferably 2 to 3 parts by weight, of potassium hydroxide.

When the optional alkali metal acetate is used, the preferred quantity, relative to the naphthalimide, is from about 0.01 to about 1.0 parts by weight (more preferably 0.09 to 0.5 parts by weight). Larger quantities of alkali metal acetate can be used, but increasing the quantity does not generally improve yields or purity and is thus not necessary or economical.

The reactive components are preferably mixed before introduction into the continuous reactor. It is also possible to mix the components within an unheated section or even a heated section of the reactor, provided that in doing so the components are adequately mixed and heated, even when the mixture is viscous. As used herein, the term "continuous reactor" encompasses any number of reactors through which solids, semi-solids, and melts can be passed while being heated and, optionally, while being mixed. Suitable continuous reactors can provide good heat transfer and thorough mixing, preferably even with highly viscous materials. Extruders comprise a particularly preferred type of continuous reactor. Examples of suitable extruders include mixing screw extruders (especially single-screw and double-screw extruders) arranged in single or multiple stages where heating and mixing can take place. The desired throughput rate is, of course, a factor in selecting the capacity of the extruder.

Regardless of the means used for mixing, the reaction mixture is passed through one or more heated zones in which a temperature of at least about 130° C. (preferably at least 160° C.) is maintained, giving rise to an initial condensation product (the "leuko" form of the desired ultimate product). In general, the reaction is exothermic and heating within the mixture becomes particularly pronounced once the temperature reaches about 160° C. Therefore, the maximum temperature reached in the heated zone is generally dependent not only on the temperature applied externally to the reactor but also on the time during which the reaction mixture is retained in the apparatus. Other factors, such as the viscosity of the reaction mixture and thermal stability of the intermediate product formed, should also be considered when selecting the reaction parameters. In general, the preferred temperature range is about 160° C. to about 300° C. The time during which the reaction mixture is heated (that is, the time within the reactor) is preferably selected to be sufficiently long to allow the reaction to proceed to completion but not so long that undesirable side reactions become significant.

The extruded melt is drowned in water or dilute aqueous base to form an aqueous medium for the subsequent oxidation step. The term "aqueous medium" refers to solutions or suspensions in water of the initial condensation product and an oxidizing agent, as well as other materials that may be present, such as unreacted starting materials, by-products, or additives. The initially formed condensation product is oxidized in the aqueous medium in the presence of an oxidizing agent that can convert the intermediate leuko form to the desired perylenetetracarboxylic diimide product without causing significant decomposition. Suitable oxidizing agents include oxygen (including air), hydrogen peroxide, and other oxidizing agents known in the art, such as peroxydisulfates, nitrates, chlorates, adducts of hydrogen peroxide and borates, or hypochlorites. Preferred oxidizing agents are air and hydrogen peroxide. Suitable additives include those that enhance the efficiency of the oxidation process, as well as help maintain particle size and prevent agglomeration. Examples of suitable additives include wetting agents and dispersing agents. Oxidation is preferably carried out using air at temperatures of at least about 25° C. (preferably 80° C. to 95° C., particularly about 90° C.).

The perylenetetracarboxylic diimide thereby formed can be isolated directly from the apparatus used for the oxidation, for example, by filtration. Under the strongly basic conditions encountered in the continuous reactor, however, unsubstituted naphthalimide (in which R is hydrogen) and the condensation product, as well as any intermediates, are always present as compounds in which R is a metal corresponding to the alkali metal hydroxide used. If another metal is desired, however, any of various exchange methods known in the art can be used. In addition, the unsubstituted perylenetetracarboxylic diimide product can be obtained without significant metal contamination by including an acidification step during isolation. It is understood that isolation step (d) includes such additional procedures.

It is, of course, also possible to prepare derivatives of the perylenetetracarboxylic diimide by further chemical reactions using any of various methods known in the art. For example, the washed perylenetetracarboxylic diimide presscake can be reslurried and alkylated under basic conditions with an alkyl halide, such as methyl chloride, to form the corresponding N,N'-dialkylated perylenetetracarboxylic diimide. In addition, perylenetetracarboxylic diimide can be hydrolyzed using a mineral acid, such sulfuric acid, at elevated temperatures to form perylenetetracarboxylic acid. The perylenetetracarboxylic acid can in turn be condensed with two molar equivalents of a primary monoamine (such as an alkylamine, arylamine, aralkylamine, alkoxylarylamine, and the like) to form an N,N'-disubstituted perylenetetracarboxylic diimide.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Perylenetetracarboxylic diimide having the following formula was prepared using a continuous reactor in Examples 1–11 and by a batchwise method in Examples 12–13.

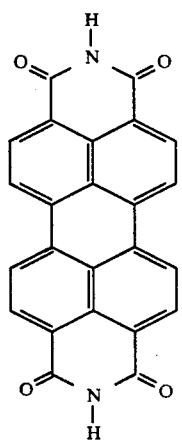

I

EXAMPLES 1-11

Continuous preparation of perylenetetracarboxylic diimide

Examples 1–11 were carried out using a single-screw stainless steel reactor equipped with a dual stage mixing screw (diameter of 0.75 inch (1.9 cm)) obtained from C. W. Brabender (stock number 05-00-145) or a standard 0.75 inch (1.9 cm) extruder screw obtained from C. W. Brabender (stock number 05-00-136). The barrel of the reactor was fitted with heater bands and thermocouples for control of the temperature and with variable speed motors for control of feed and extrusion rate.

Three temperature zones were used for both reactors. Except as otherwise specified in the examples, the first zone was heated externally at about 175° C. and the second and third zones were heated at about 280° C. The temperatures that the reaction mixtures actually attained in each zone are given in each example. In general, the reaction mixtures remained relatively cool and viscous in first zone, thereby reducing backflow, which can occur as the reaction mixtures becomes hotter and more fluid.

Because the continuous reactors used in Examples 1–11 were fed with continuous streams of naphthalimide, potassium hydroxide flakes, and sodium acetate, the quantities of these materials are given as relative parts by weight.

Spectro purity and yield of perylenetetracarboxylic diimide prepared in each Example was determined by comparison with a standard purified sample prepared according to the method described in U.S. Pat. No. 4,588,814 at column 3, lines 46–63 (Example 1).

EXAMPLE 1

A mixture of one part by weight naphthalimide (97% purity), 3 parts by weight potassium hydroxide flakes, and 0.5 parts by weight sodium acetate was, after premixing, introduced into a standard mixing screw in which the mixture was passed at a throughput rate of 4.6 g/min through the first heated zone at a temperature of 136° C. and then through the subsequent heated zones at temperatures of from about 227° C. to 287° C. A 274 g sample of the reaction mixture was collected in 4 liters of water over a period of 60 minutes. The resultant slurry was air oxidized at 90°–95° C. by passing air through a fritted tube. Heating was continued for about 1 hour after the color of the material became dark red. The resultant material was collected by filtration and washed with water, giving a presscake. The presscake was reslurried in about 4 liters of water and acidified with hydrochloric acid to pH 2.0–2.5, then heated to 90° C. for 1 hour. The product was then isolated by filtration and washed with water until neutral, giving 63 g of perylenetetracarboxylic diimide as dry product (90% yield, based on a spectro purity of 92%).

EXAMPLE 2

A mixture of one part by weight naphthalimide (69% purity), 3 parts by weight potassium hydroxide flakes, and 0.5 parts by weight sodium acetate was, after premixing, introduced into a standard mixing screw in which the mixture was passed at a throughput rate of 4.9 g/min through the first heated zone at a temperature of 135° C. and then through the subsequent heated zones at temperatures of from about 215° C. to 288° C. A 945 g sample of the reaction mixture was collected in 8 liters of water over a period of 180 minutes. Subsequent steps were carried out as in Example 1, giving 140 g of perylenetetracarboxylic diimide as dry product (84% yield, based on a spectro purity of 93%).

EXAMPLE 3

A mixture of one part by weight naphthalimide (95% purity), 2 parts by weight potassium hydroxide flakes, and 0.18 parts by weight sodium acetate was, after premixing, introduced into a dual stage mixing screw in which the mixture was passed at a throughput rate of 2 g/min through the first heated zone at a temperature of 141° C. and then through the subsequent heated zones at temperatures of from about 256° C. to 313° C. A 120 g sample of the reaction mixture was collected in one liter of water over a period of 60 minutes. Subsequent steps were carried out as in Example 1, except for using 1 liter of water to reslurry the presscake, giving 31 g of perylenetetracarboxylic diimide as dry product (76% yield, based on a spectro purity of 95%).

EXAMPLE 4

The procedure of Example 3 was repeated on a larger scale the same relative proportion of naphthalimide, potassium hydroxide flakes, and sodium acetate except for using a throughput rate of 3.6 g/min. A 1954 g sample of the reaction mixture was collected in 16 liters of water over a period of 540 minutes. After air oxidization was complete, the resultant material was collected by filtration and washed with water to give a presscake that was reslurried in about 16 liters of water, then acidified and heated as in Example 1. The product was filtered and washed until neutral, giving 558 g of perylenetetracarboxylic diimide as dry product (87% yield, based on a spectro purity of 95%).

EXAMPLE 5

The procedure of Example 3 was repeated using the same relative proportion of reactants, but the mixture was passed at a throughput rate of 5.3 g/min through the first heated zone at a temperature of 122° C. and then through the subsequent heated zones at temperatures of from about 223° C. to 295° C. A 106 g sample of the reaction mixture was collected in 1 liter of water over a period of 20 minutes. After air oxidization was completed, the resultant material was collected by filtration and washed with water to give a presscake that was reslurried, acidified, and heated as in Example 1. The product was filtered and washed until neutral, giving 26 g of perylenetetracarboxylic diimide as dry product (70% yield, based on a spectro purity of 93%).

Examples 3-5 illustrate the effect of throughput rate on yield.

EXAMPLE 6

A mixture of one part by weight naphthalimide (99% purity), 2 parts by weight potassium hydroxide flakes and 0.18 parts by weight sodium acetate was, after premixing, introduced into a standard mixing screw in which the mixture was passed at a throughput rate of 4.4 g/min through the first heated zone at a temperature of 141° C. and then through the subsequent heated zones at temperatures of from about 251° C. to 342° C. A 490 g sample of the reaction mixture was collected in 4 liters of water over a period of 111 minutes. Subsequent steps were carried out as in Example 1, giving 126 g of perylenetetracarboxylic diimide as dry product (75% yield, based on a spectro purity of 95%).

EXAMPLE 7

A mixture of one part by weight naphthalimide (95% purity), 2 parts by weight potassium hydroxide flakes, and 0.09 parts by weight sodium acetate was, after premixing, introduced into a standard mixing screw in which the mixture was passed at a throughput rate of 5.2 g/min through the first heated zone at a temperature of 122° C. and then through the subsequent heated zones at temperatures of from about 150° C. to 306° C. A 157 g sample of the reaction mixture was collected in one liter of water over a period of 30 minutes. Subsequent steps were carried out as in Example 1, except for using 1 liter of water to reslurry the presscake, giving 41 g of perylenetetracarboxylic diimide as dry product (73% yield, based on a spectro purity of 92%).

EXAMPLE 8

A mixture of one part by weight naphthalimide (95% purity), 2 parts by weight potassium hydroxide flakes, and 0.18 parts by weight sodium acetate was, after premixing, introduced into a standard mixing screw in which the mixture was passed at a throughput rate of 5.1 g/min through the first heated zone at a temperature of 123° C. and then through the subsequent heated zones at temperatures of from about 151° C. to 304° C. A 153 g sample of the reaction mixture was collected in 1 liter of water over a period of 30 minutes. Subsequent steps were carried out as in Example 7, giving 40 g of perylenetetracarboxylic diimide as dry product (74% yield, based on a spectro purity of 91%).

EXAMPLE 9

A mixture of one part by weight naphthalimide (95% purity), 2 parts by weight potassium hydroxide flakes, and 0.37 parts by weight sodium acetate was, after premixing, introduced into a standard mixing screw in which the mixture was passed at a throughput rate of 4.9 g/min through the first heated zone at a temperature of 123° C. and then through the subsequent heated zones at temperatures of from about 149° C. to 303° C. A 147 g sample of the reaction mixture was collected in one liter of water over a period of 30 minutes. Subsequent steps were carried out as in Example 7, giving 34 g of perylenetetracarboxylic diimide as dry product (71% yield, based on a spectro purity of 92%).

EXAMPLE 10

A mixture of one part by weight naphthalimide (95% purity) and 2 parts by weight potassium hydroxide flakes (but no sodium acetate) was, after premixing, introduced into a standard mixing screw in which the mixture was passed at a throughput rate of 4.9 g/min through the first heated zone at a temperature of 121° C. and then through the subsequent heated zones at temperatures of from about 152° C. to 301° C. A 148 g sample of the reaction mixture was collected in one liter of water over a period of 30 minutes. Subsequent steps were carried out as in Example 7, giving 34 g of perylenetetracarboxylic diimide as dry product (59% yield, based on a spectro purity of 90%).

Examples 7-9 show that the quantity of sodium acetate has little effect on yield or purity. Example 10, however, shows that the absence of sodium acetate can significantly affect yield.

EXAMPLE 11

A mixture of one part by weight naphthalimide (98% purity), 4 parts by weight potassium hydroxide flakes, and 0.67 parts by weight sodium acetate was, after premixing, introduced into a standard mixing screw in which the mixture was passed at a throughput rate of 5.4 g/min through the first heated zone at a temperature of 140° C. and then through the subsequent heated zones at temperatures of from about 222° C. to 290° C. A 417 g sample of the reaction mixture was collected in 4 liters of water over a period of 77 minutes. Subsequent steps were carried out as in Example 1, giving 73 g of perylenetetracarboxylic diimide as dry product (87% yield, based on a spectro purity of 92%).

EXAMPLES 12–13

Batchwise preparation of perylenetetracarboxylic diimide

Examples 12 and 13 are batchwise preparations carried out by way of comparison to show that the continuous process illustrated in Examples 1–11 provides at least comparable yields and purities, even when using smaller quantities of potassium hydroxide.

EXAMPLE 12

A mixture of 220 g of potassium hydroxide flake and 12 g of water was introduced into a resin flask and heated to 215° C. An additional 440 g of potassium hydroxide was then added. After the alkaline melt was further heated at 215° C., 100 g of sodium acetate was added. Once the components were mixed, 212 g naphthalimide (95% purity) was added over a period of 1.5 to 2.5 hours. The molten reaction mass was then stirred at 230°–235° C. for 2.5 hours. The resultant material was poured slowly into 1 liter of water and then oxidized by heating to 90° C. with air until the slurry turned brick red. The resultant material was collected by filtration and washed with water. The resultant presscake was reslurried in water and acidified with concentrated sulfuric acid to pH 2.0–2.5, then heated to 90° C. for 1 hour. The product was isolated by filtration and washed with water until neutral, giving 171 g of perylenetetracarboxylic diimide as dry product (72% yield, based on a spectro purity of 90%).

EXAMPLE 13

A mixture of 220 g of potassium hydroxide flake and 12 g of water was introduced into a resin flask and heated to 180° C. An additional 440 g of potassium hydroxide was then added. After the alkaline melt was further heated at 200° C., 100 g of sodium acetate was added. Once the components were mixed, 212 g naphthalimide (97% purity) was added over a period of 1.5 hours. The remaining steps were carried out as in Example 12, giving 176 g of perylenetetracarboxylic diimide as dry product (79% yield, based on a spectro purity of 93%).

What is claimed is:

1. A process for the continuous preparation of a perylenetetracargboxylic diimide of the formula

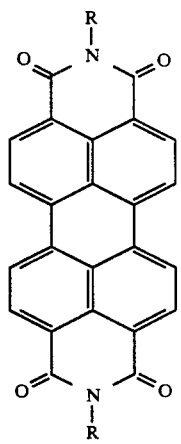

wherein each R is independently hydrogen, $C_1$-$C_6$ alkyl, $C_7$-$C_{15}$ aralkyl, or a metal atom, comprising
(a) preparing a reaction mixture by mixing
   (1) a naphthalimide of the formula

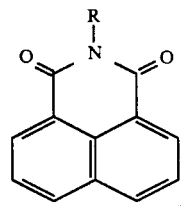

wherein R is hydrogen, $C_1$-$C_6$ alkyl, $C_7$-$C_{15}$ aralkyl, or a metal atom,
   (2) at least one part by weight, based on the naphthalimide, of one or more alkali metal hydroxides, and
   (3) optionally, an alkali metal carboxylate;
(b) passing the reaction mixture through a continuous reactor having one or more heated zones at a temperature of at least 130° C. to form a condensation product;
(c) oxidizing the condensation product in an aqueous medium to form the perylenetetracarboxylic diimide; and
(d) isolating the perylenetetracarboxylic diimide.

2. A process according to claim 1 wherein each R is hydrogen.

3. A process according to claim 1 wherein the alkali metal hydroxide is potassium hydroxide or a mixture of potassium hydroxide and sodium hydroxide.

4. A process according to claim 3 wherein 1.6 to 5 parts by weight, based on the naphthalimide, of potassium hydroxide are used.

5. A process according to claim 3 wherein 2 to 3 parts by weight, based on the naphthalimide, of potassium hydroxide are used.

6. A process according to claim 1 wherein 0.01 to 1.0 parts by weight of an alkali metal carboxylate is used.

7. A process according to claim 6 wherein the alkali metal carboxylate is sodium acetate.

8. A process according to claim 1 wherein components (a)(1), (a)(2), and (a)(3) are mixed in solid form before being passed through the continuous reactor.

9. A process according to claim 1 wherein one or more of components (a)(1), (a)(2), or (a)(3) is added in molten form before being passed through the continuous reactor.

10. A process according to claim 1 wherein the reaction mixture is mixed before being passed through the continuous reactor.

11. A process according to claim 1 wherein the reaction mixture is mixed within the continuous reactor.

12. A process according to claim 1 wherein the continuous reactor is a mixing screw extruder.

13. A process according to claim 1 wherein the reaction mixture is passed through a continuous reactor at a temperature of at least 160° C.

14. A process according to claim 1 wherein the reaction mixture is passed through a continuous reactor at a temperature in the range of from 160° C. to 300° C.

15. A process according to claim 1 wherein the continuous reactor has more than one heated zone.

16. A process according to claim 1 wherein the the condensation product is oxidized with air.

17. A process according to claim 1 for the continuous preparation of perylenetetracarboxylic diimide of the formula

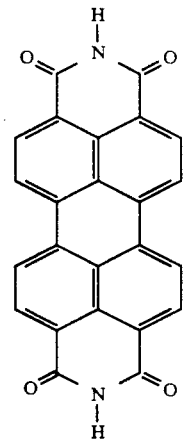

comprising
(a) preparing a reaction mixture by mixing in solid form
(1) naphthalimide of the formula

(2) 2 to 3 parts by weight, based on the naphlhalimide, of potassium hydroxide, and
(3) 0.01 to 1.0 parts by weight of sodium acetate;
(b) passing the reaction mixture through a mixing screw extruder more than two heated zones at a temperature in the range of from 160.C to 300.C to form a condensation product;
(c) oxidizing the condensation product with air in an aqueous medium to form the perylenetetracarboxylic diimide; and
(d) isolating the perylenetetracarboxylic diimide.

18. A process according to claim 17 wherein the reaction mixture is mixed before being passed through the extruder.

19. A process according to claim 17 wherein the reaction mixture is mixed within the extruder.

* * * * *